United States Patent [19]
Kochanneck

[11] 3,978,991
[45] Sept. 7, 1976

[54] STORAGE INSTALLATION WITH AUTOMATIC PICK-UP DEVICE

[76] Inventor: Uwe Kochanneck, 81, Neuer Graben, Dortmund, Germany, 46

[22] Filed: Aug. 15, 1974

[21] Appl. No.: 488,359

Related U.S. Application Data

[63] Continuation-in-part of Ser. No. 442,715, March 26, 1974.

[30] Foreign Application Priority Data

Sept. 3, 1973 Germany............................ 2344329

[52] U.S. Cl. ............................ 214/1 BT; 214/6 FS; 214/16.4 A; 294/65
[51] Int. Cl.² ......................................... B65G 61/00
[58] Field of Search............. 214/621, 658, 650 SG, 214/620, 1 BT, 6 FS, 8.5 D, 16.4 A; 294/65

[56] References Cited
UNITED STATES PATENTS
| | | | |
|---|---|---|---|
| 3,697,112 | 10/1972 | Nielson...................... | 214/650 SG X |
| 3,773,201 | 11/1973 | Thompson.......................... | 214/621 |

Primary Examiner—L. J. Paperner
Assistant Examiner—Randolph A. Reese
Attorney, Agent, or Firm—Michael J. Striker

[57] ABSTRACT

A storage installation comprising a plurality of automatic pick-up devices for article picking operations. The automatic pick-up device having a frame cross beam with mounted gripping mechanisms on the bottom side depending in construction on the articles to be picked up. The automatic pick-up device is moved by means of automatic load gripping devices within a load area of a storage installation. Four horizontally extendable locking arms are mounted on the frame cross beam of the automatic pick-up device. For an operation cycle of the load gripping device with pick-up device, the telescopable elements of the load gripping device effect an activator circuit for extension of the locking arms which then engage in locking counterparts mounted on the telescopable elements. After this, the load gripping device moves with suspended pick-up device to table rollers or empty pallets within the load area for article entrance and exit operation. All pick-up operations are checked by means of a television camera mounted on the load gripping devices.

3 Claims, 5 Drawing Figures

STORAGE INSTALLATION WITH AUTOMATIC PICK-UP DEVICE

This application is a continuation-in-part of application Ser. No. 442,715, filed Mar. 26, 1974.

The automatic pick-up of seperate articles which are combined in greater units on optional loading auxiliaries as pallets or similar means, is an important technical and economical problem within the former known storage plants, with the predominating system of side by side standing racks and one aisle between two racks. The patent application with Ser. No. 442,715 opens new aspects in this area because the articles do not have to be lifted out from the side, but can be seized from the top.

The task of this invention exists in developing an automatic pick-up device for a storage installation according to patent application with Ser. No. 442,715 to serve also for storage and material operations in optional places. The device of the invention otherwise serves as economical standard equipment which for general application is only to be adapted directly by its article gripping mechanisms corresponding to the separate articles to be removed. This is achieved in accordance with the present invention in that a frame cross beam with undermounted article gripping mechanisms will be lifted up automatically by load gripping devices which are provided for total load transport, and can be furthermore deposited within a load area, after an article pick-up operation, at an optional position.

This and other aims and features of the present invention will become more apparent upon a consideration of the following description taken in connection with the accompanying drawings wherein.

Figure 1:
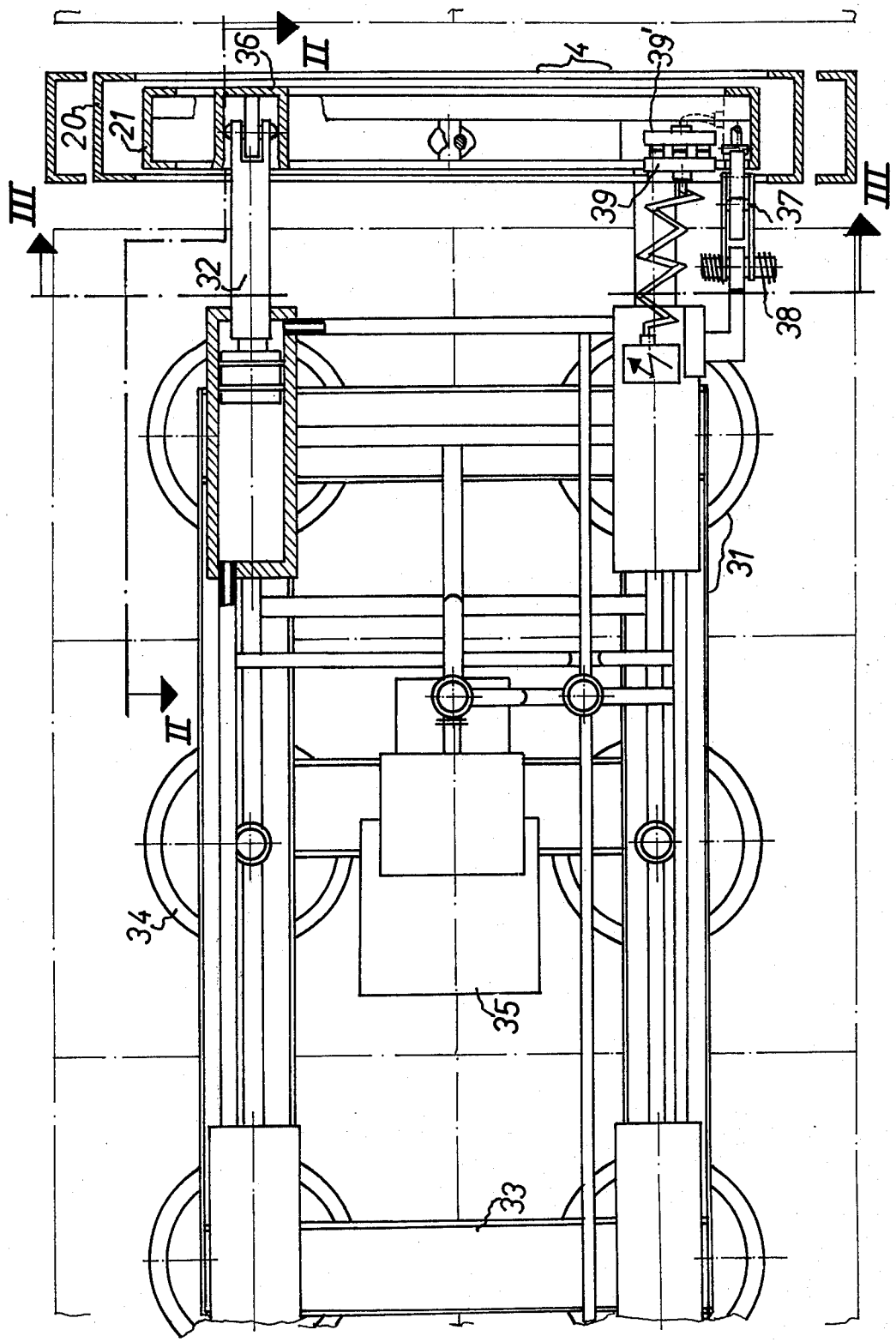
FIG. 1 is a plan view of an automatic pick-up device which is engaged in a load gripping appliance.
Figure 2:
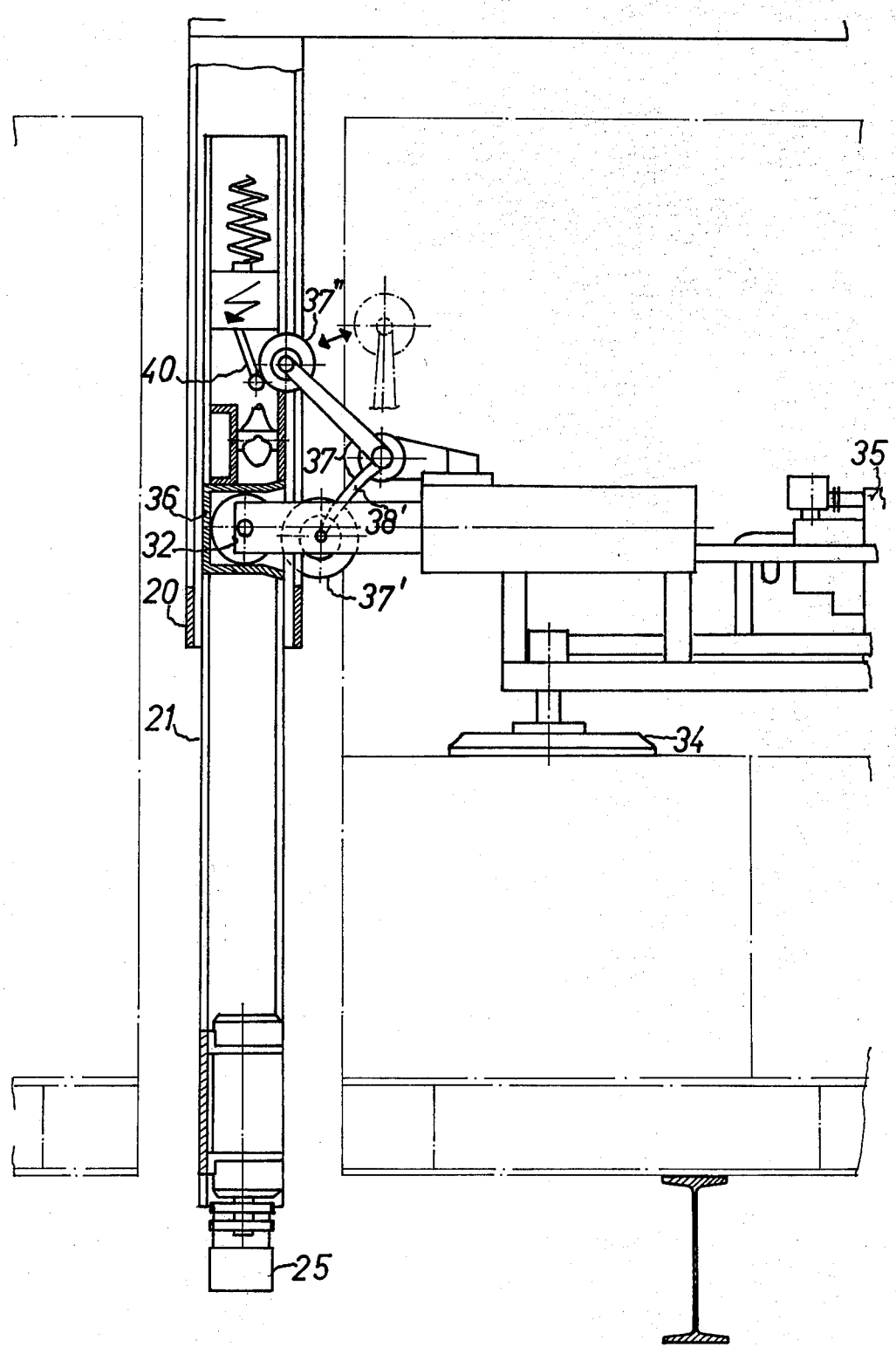
FIG. 2 is a front view and a section to line II—II of FIG. 1.
Figure 3:
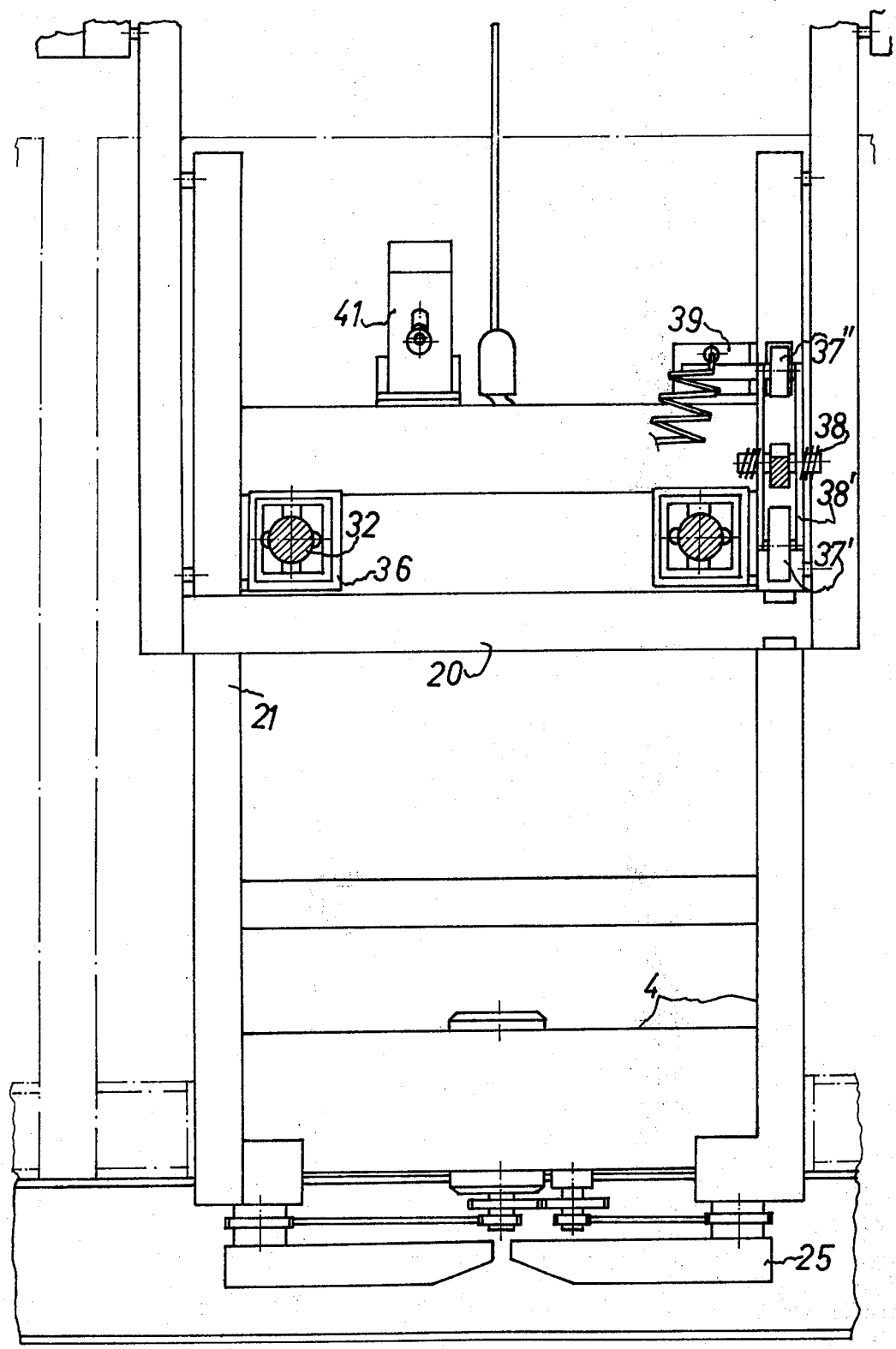
FIG. 3 is a section to line III—III of FIG. 1.
Figure 4:
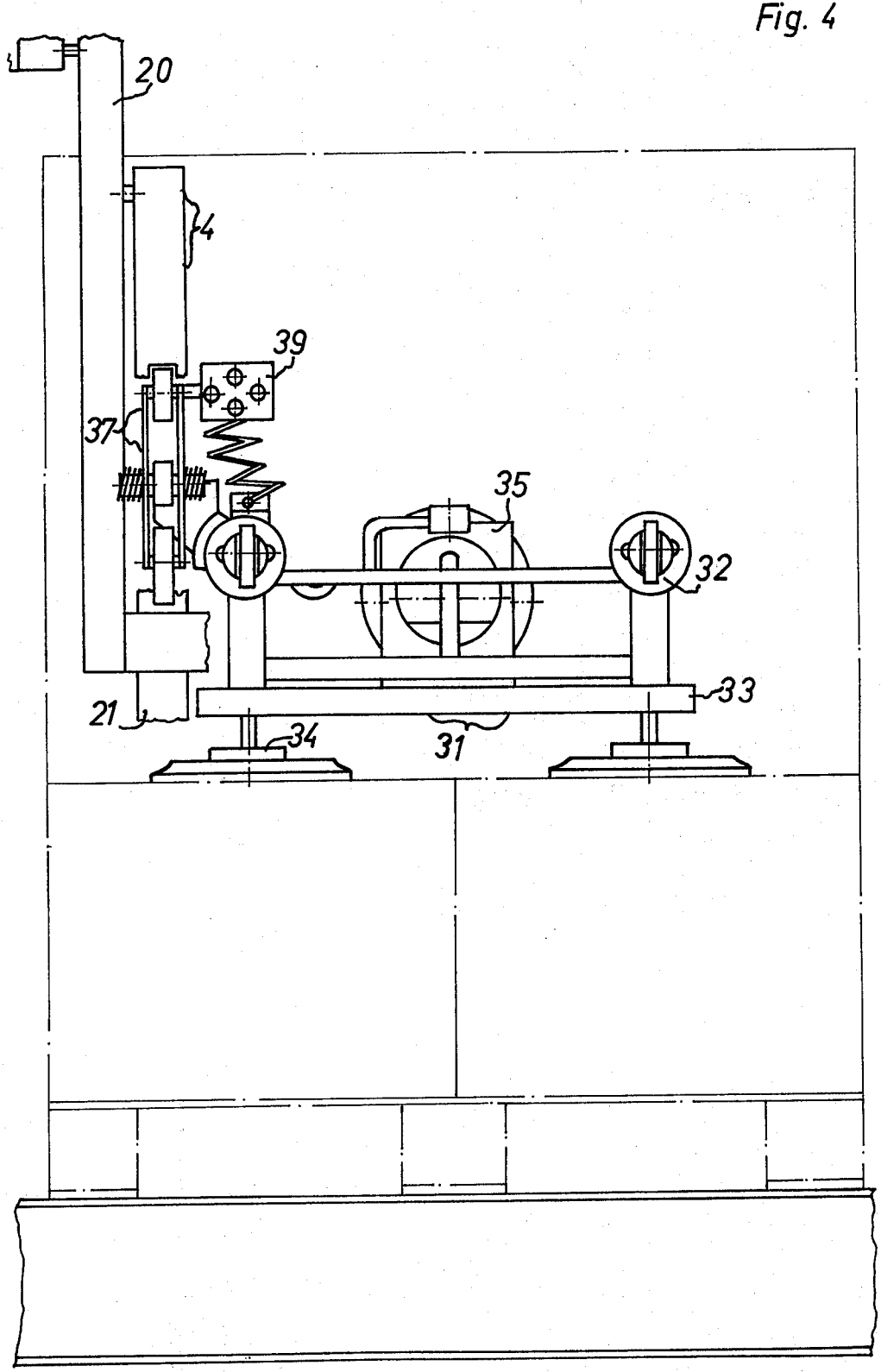
FIG. 4 is a side view of FIG. 1
Figure 5:
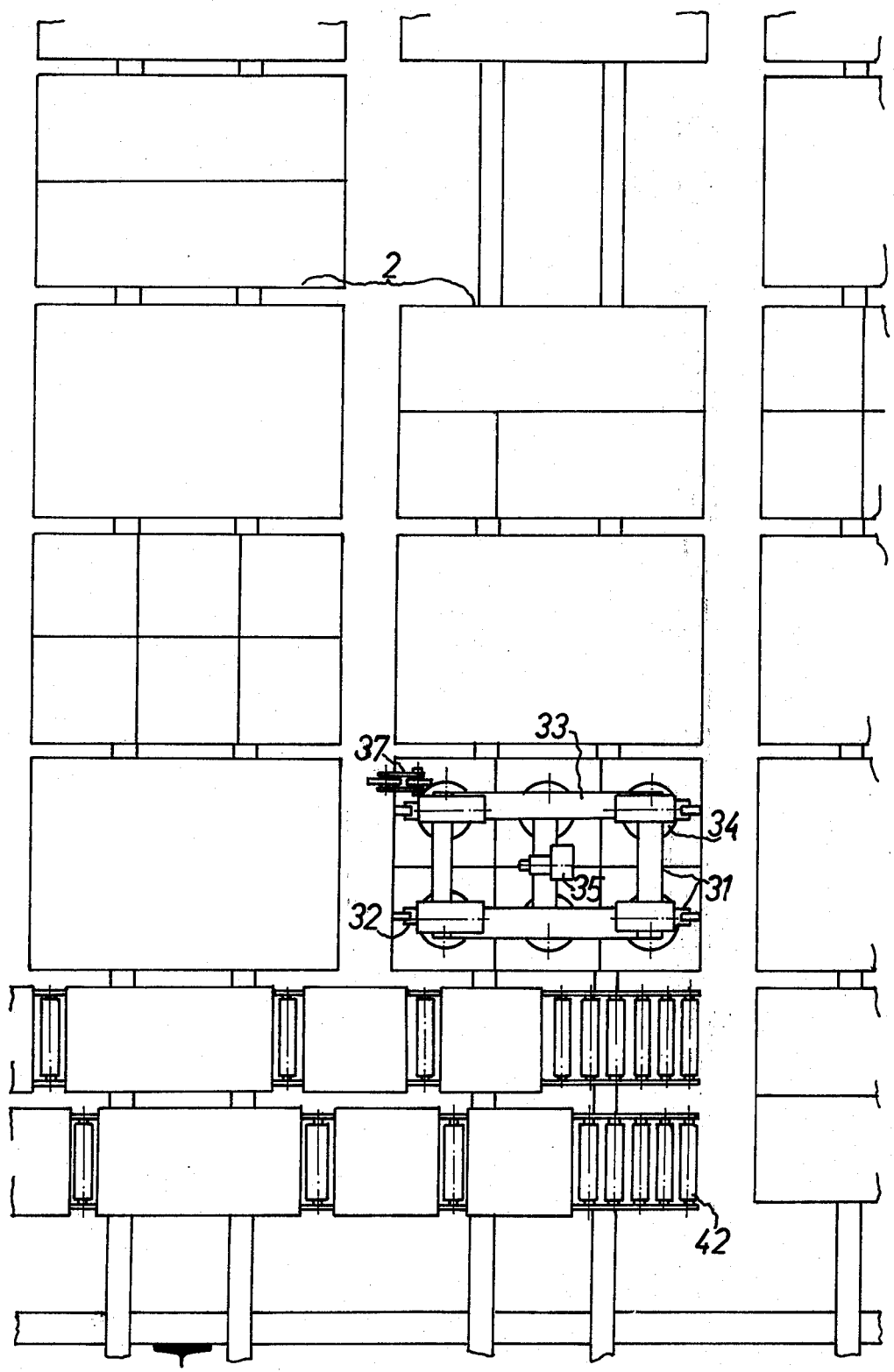
FIG. 5 is the functional principle of an automatic pick-up device within a storage installation in accordance with patent application Ser. No. 442,715.

The automatic pick-up device 31 will be suspended into the middle telescopable element 21 of a load gripping device 4 by means of four extendable locking bars 32. At the underside of the frame cross beam 33 is incorporated the article gripping mechanism 34, in the given example constructed as suction plates. The design and number of article mechanisms 34 which could be suction plates, magnets, finger grabs or similar mechanisms is not a critical feature of the invention. The driving elements 35 for providing the necessary power to the suction plates for carrying the articles, also activates the locking bars 32 so that they slide into the sockets 36 of the device 4. After the locking operation and the connection of current supply and control-impulse lines between the automatic pick-up device 31 and the load gripping device 4 which is realized by the angled lever 37, the locking bars 32 are, as a result, engaged in the locking counterparts or sockets 36 of the load gripping device 4.

The pick-up device 31, controlled from a control center, can be deposited by the load gripping device 4 at any given place within a load area 2, if there is no further need for article picking up operations. For the purpose of lifting the picking-up device 31, the load gripping device 4 extends its telescopable elements on both sides of a corresponding storage place, as it is necessary to do in order to lift a whole load. The forks 25 remain, however, pivoted in. By lowering the telescopable elements 21, the synthetic plastic sheave 37' of the angled lever 37 will be pivoted in against the force of the return spring 38 and rolls onto the lowering telescopable front element 21 just like the synthetic plastic sheave 37" of the opposite lever point. When the middle telescopable element 21 reaches the final lowering position, the synthetic sheave 37" engages in a recess in the middle telescopable element 21 by the pressure of the spring element 38'. Simultaneously the switch contact plate 39 is pressed against the counterpart 39' which is mounted on the middle telescopable element 21 and realizes the current supply and the control-impulse connection between the load gripping device 4 and the pick-up device 31 by means of the automatically engaging switch 40. The control-impulse for extending the locking bars 32 will be emitted from the control center. After this, the pick-up device 31 can be transported by the load gripping device 4 to a predetermined storage place within a load area 2, and the telescopable element 21,20 will then be lowered over a total load and through it the pick-up device 31 will automatically lift the articles. The control center checks the emitted pick-up orders by the television camera 41. The picked up articles will be deposited on empty pallets, on table rollers 42 or similar, within a load area 2. The deposition of the pick-up device after a pick-up operation will be executed in reverse. After removal of the pick-up device 31, the load gripping device 4 will again be available for the storage operations of total loads. This makes feasible, without time consumption, not only reciprocal picking up of articles and total load storage operations within a load area 2 of a storage installation according to patent application with Ser. No. 442,715, but also pick up and storage operations at alternative locations, determined by the user.

While the invention has been described and shown with particular reference to the given example, it will be apparent that variations might be possible that would fall within the scope of the present invention which is not intended to be limited, except as defined in the following claims.

What is claimed is:

1. A storage installation, comprising load-gripping means having a plurality of parallel telescopable elements surrounding a central space and each including three telescopable sections; a socket in the center one of said telescopable sections of the respective telescopable elements; article pick-up means arranged to be positioned within said central space surrounded by said telescopable elements; locking means on said pick-up means and engageable in the respective sockets; actuating means responsive to telescoping-apart of the respective sections for actuating said locking means to cause engagement thereof with said sockets so as to lock said pick-up means to said load-gripping means; and means for effecting connection of current supply lines and activator circuit lines between said load-gripping means and said pick-up means in automatic response to operation of said actuating means.

2. A storage installation as defined in claim 1, wherein said pick-up means comprises a plurality of gripping mechanisms.

3. A storage installation as defined in claim 1; and further comprising a television camera on one of said telescopable elements for monitoring the operation of said pick-up means.

* * * * *